United States Patent [19]

Wood et al.

[11] 4,191,982

[45] Mar. 4, 1980

[54] MAGNETIC TRANSDUCING HEAD WITH A TURN IN THE GAP

[75] Inventors: William P. Wood, St. Louis Park; Raymond E. Jutila, Wayzata, both of Minn.

[73] Assignee: Magnetic Peripherals Inc., Minneapolis, Minn.

[21] Appl. No.: 927,320

[22] Filed: Jul. 24, 1978

[51] Int. Cl.² .............................................. G11B 5/20
[52] U.S. Cl. .................................................... 360/123
[58] Field of Search ........ 360/120, 123, 121, 125–126; 29/603

[56] References Cited

U.S. PATENT DOCUMENTS

| 2,615,097 | 10/1952 | Camras | 360/120 |
| 3,535,466 | 10/1970 | Foster | 360/123 |
| 3,805,291 | 4/1974 | Sakurai | 360/123 X |

FOREIGN PATENT DOCUMENTS 541194 12/1976 U.S.S.R. .................................. 360/121

*Primary Examiner*—John H. Wolff
*Attorney, Agent, or Firm*—Edward L. Schwarz

[57] ABSTRACT

An improved magnetic data transducer having a short gap with improved performance during writing, and substantially unaffected performance during reading. This is accomplished by placing one or more of the turns of the winding in the gap, occupying a fraction of the gap adjacent the transducing face. This simulates increasing gap reluctance during writing, by causing increased flux fringing.

6 Claims, 3 Drawing Figures

MAGNETIC TRANSDUCING HEAD WITH A TURN IN THE GAP

BACKGROUND

In the typical disc memory produced today, data in the concentric tracks is written and read by the same magnetic transducing head. As currently designed, such a head has a ferrite core having a flux gap and a winding comprising on the order of 10 to 20 wire turns. Because of fabrication difficulties and the relatively large number of turns, the usual procedure is to wind all of the turns through the loop area of the core. (By loop area is meant the area around which the magnetic path closes.) The areas of the faces defining the flux gap are equal to or less than the cross sectional area of the flux path through the core. In such a case, most of the reluctance in the core is in the gap itself, causing the flux fringing which performs the writing. The large number of turns provides the needed magnetomotive force (MMF) without high amperage during writing, and the large number of turns further provide the needed sensitivity during reading.

BRIEF DESCRIPTION OF THE INVENTION

We have found that the write performance of a multi-turn magnetic head can be improved by placing one of the turns in the gap so as to occupy as little of the gap as possible, and to be as closely adjacent the transducing face as possible. In particular, we have found that with deposited heads having a relatively small number of turns, increased gap reluctance can be simulated by so placing one of the turns, significantly increasing the amount of flux available for writing. At the same time, it seems that readback is not significantly affected by this different placement.

PATENTABILITY DISCUSSION

The pertinent prior art includes first of all, the single turn heads having the turn in the gap. These appear to be always designed so that the turn occupies essentially the entire gap. They differ from the instant invention in that only a single turn is employed and it fills the entire gap rather than leaving the gap portion adjacent the loop area empty. See *Journal of Applied Physics*, Vol. 42, No. 13, Dec. 1971, Analysis of the Efficiency of Thin-Film Magnetic Recording Heads; and *IEEE Transactions on Magnetics*, Vol. MAG-11, No. 5, Sept. 1975, Batch Fabricated Heads from an Operational Standpoint.

U.S. Pat. No. 3,805,291, discloses a head having several turns in the gap. This head is different from that of the invention in that apparently no turns are present in the loop area of the core, and that in fact the core does not have a flux path loop area which encircles an area through which the windings pass. In *IEEE Transactions on Magnetics*, Vol. MAG-12, No. 6, Nov. 1976, Combined Thin Film Magnetoresistive Read, Inductive Write Heads, the authors disclose a head having a write winding in the loop area and a magnetoresistive turn in the gap for reading. However, these two elements are considered as separate entities, each being inactive while the other is in use. Typical of magnetoresistive elements, current must be passed through the conductor in the gap during reading.

The art known discloses neither a winding having a turn occupying the part of the gap most closely adjacent the transducing face, nor a winding with one or more turns in a loop area of the core and a turn passing through the gap as well. This being the case, we feel the application contains patentable subject matter.

DESCRIPTION OF THE PREFERRED EMBODIMENTS

Figure 1:
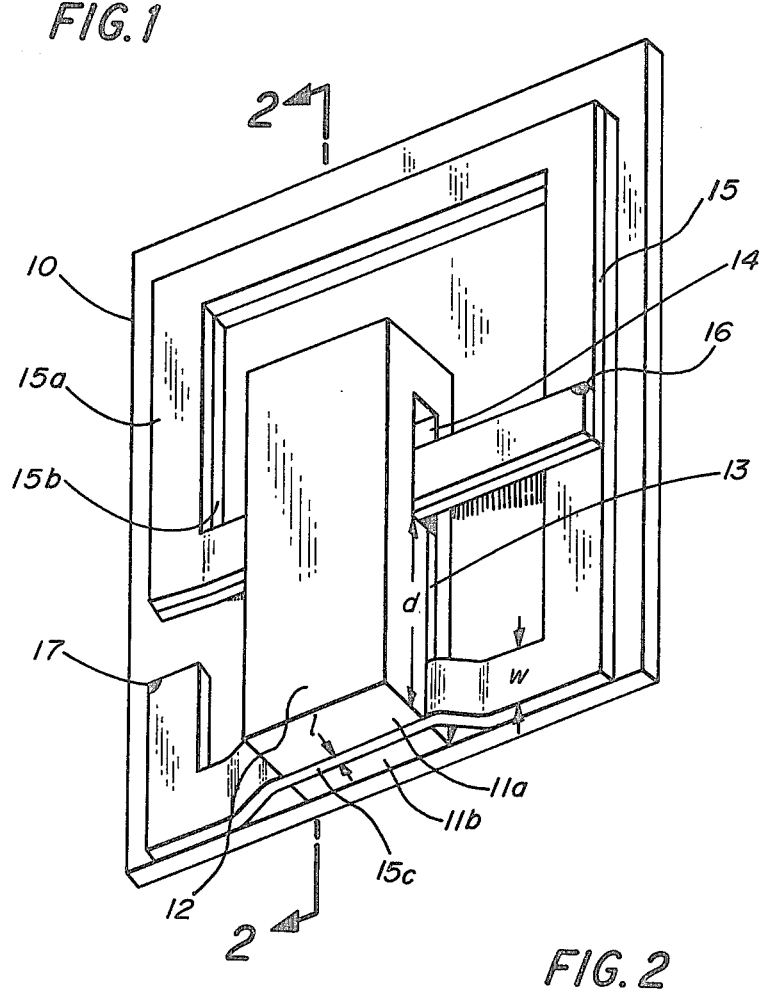
FIG. 1 is a perspective view of a magnetic head embodying the invention.
Figure 2:
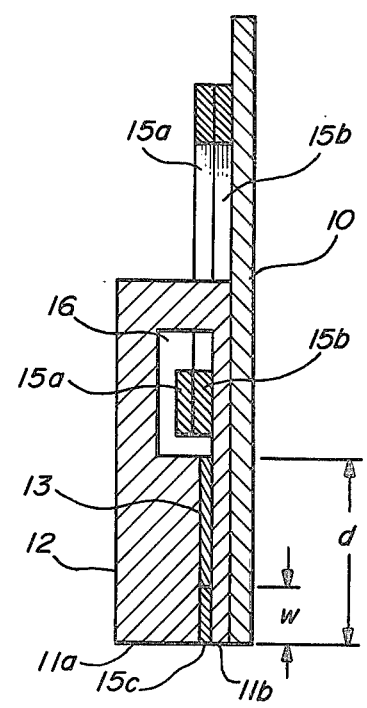
FIG. 2 is a sectional view of the head shown in FIG. 1.

FIG. 1 shows a preferred embodiment of the magnetic head of this invention mounted on a substrate 10 formed of an insulating material. Although substrate 10 is shown as quite thin, the thickness may well be the substrate's largest dimension when the substrate carries the flying surface for the head. Core 12 furnishes the magnetic path and forms a closed magnetic path around loop opening 14, save for magnetic gap 13. Core 12 carries a transducing face comprising core faces 11$a$ and 11$b$ which are intended during transducing operations to fly very close to the recording medium, and which are separated by gap 13. Core 12 typically is deposited by some method, such as electron beam or (preferred) sputtering techniques on substrate 10. Winding 15 comprises turns 15$a$, 15$b$, and 15$c$, all insulated from each other, and again typically all deposited on substrate 10. Winding 15 has end taps 16 and 17 which function as signal terminals. Turn 15$c$ is placed in gap 13 as closely adjacent to core faces 11$a$ and 11$b$ as possible and with its exterior surface flush with them. It is preferred that w/d be as small as possible, w being the width of turn 15$c$ and d being the depth of gap 13. Typically, for ease of fabrication, the part of gap 13 not filled with turn 15$c$, and spaces between winding 15 and substrate 10, are all filled with nonmagnetic insulating material for ease of fabrication. FIG. 2 shows gap 13 filled with such a material in the volume not occupied by turn 15$c$.

Figure 3:
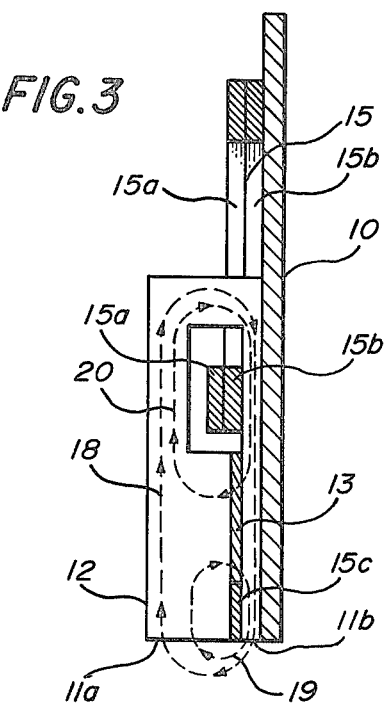
FIG. 3 is a sectional view similar to that of FIG. 2, showing idealized flux lines generated by current flow in the winding.

Flux lines 18–20 shown in FIG. 3 symbolize the magnetic fields produced by winding 15 during a writing operation. Winding 15 is approximately 2½ total turns. Because of the arrangement, however, three conductors pass between parts of core 12 and produce magnetic flux therein. Turn 15$c$ can be thought of as producing flux line 19. Turns 15$a$ and 15$b$ respectively produce flux lines 18 and 20. Because of the relatively large area of gap 13 not occupied by turn 15$c$, a substantial amount of its flux tends to leak across gap 13 rather than taking the longer path through core 12. This leakage flux tends to oppose flux generated by turns 15$a$ and 15$b$, simulating increased reluctance of gap 13 and causing an extra amount of this flux to follow the path indicated by flux line 18 through the air adjacent core faces 11$a$ and 11$b$. This increases the magnetomotive force of the flux leaking into the air adjacent gap 13, and permits use of higher coercivity media. This in turn permits greater linear bit densities and greater storage capacity for the medium.

Although only a single turn 15$c$ is shown in gap 13, two or more turns can be located therein with somewhat increased magnetic efficiency. However, we have found it impractical to do so for several reasons. There is the obvious factor of increased fabrication expense and difficulty. Secondly, there is the simple physical problem of finding suitable volume within gap 13 to contain the additional turns. As explained earlier, it is preferable that w/d is as small as possible, and that turn 15c be located as close to transducing surfaces 11a and 11b as possible. It is important for accuracy in reading back data that gap length d be as small as possible. Furthermore, when writing, a relatively large amount of flux, about one ampere turn, is necessary for sufficient writing level. When dealing with a winding such as winding 15 which has but two or three turns, current must be in the range of several hundred milliamperes, necessitating relatively large conductor cross sections to prevent overheating and electro-migration. Because of all of these conflicting requirements and restrictions, we recommend at this time that only a single turn be placed in gap 13 although changes in technical direction and technical advances may sometime make two or more turns placed in gap 13 advantageous.

Similar analysis is apropos in applying this invention to conventional heads having 10 to 20 turn windings and ferrite cores. Placing one or more turns in the gap is normally not done because of the fact that fabrication of a ferrite core having a turn in the gap is extremely difficult. Heat and pressure normally employed in assembling such a core will damage the conductor. Secondly, the 10 to 20 turns usually employed in the winding produces adequate amounts of flux during writing without resort to the expedient of a conductor in the gap. And because of the relatively large number of turns in the winding, additional leakage flux available for writing generated by a gap conductor would be relatively small compared to a head having only two turns in the loop area and which already suffers from marginal write performance. Lastly, the cross-sectional area of the core at the gap of such cores is so small that little leakage of flux from the turn across the gap occurs. There is no doubt, however, that write flux could be somewhat increased in the conventional wound ferrite core type of head by placing a turn in th gap.

We claim:
1. A magnetic transducing head comprising
 (a) a magnetic core having a transducing face, a loop area defined by an opening through the core, and a flux gap extending from the transducing face to the loop area and defined by flux gap faces, said flux gap having a length dimension substantially parallel to the transducing face which is substantially shorter than the maximum loop area dimension in the flex gap length direction; and
 (b) a multi-turn winding having end taps serving as signal terminals, and having at least one turn passing through the loop area and surrounding a part of the core defining the loop area, and at least one other turn passing through the flux gap between the flux gap faces adjacent the transducing face, surrounding a part of the core defining the loop area, and occupying substantially less than the entire gap height in the gap;
 whereby a portion of the flux generated by the gap turn when current is passed through it leaks through the flux gap between the loop area and the gap turn and opposes flux generated by the loop turn, thereby increasing the apparent gap reluctance and fringing flux adjacent the transducing face.

2. The head of claim 1 wherein the exterior edge of the other turn between the gap faces is substantially flush with the transducing face.

3. The head of claim 2, wherein a single turn of the winding is in the flux gap.

4. The head of claim 1, wherein a single turn of the winding is in the flux gap.

5. The head of claim 4, wherein the turn in the flux gap occupies a small fraction of the gap.

6. The head of claim 5, wherein the exterior edge of the conductor in the gap is substantially flush with the transducing face.

* * * * *